UNITED STATES PATENT OFFICE.

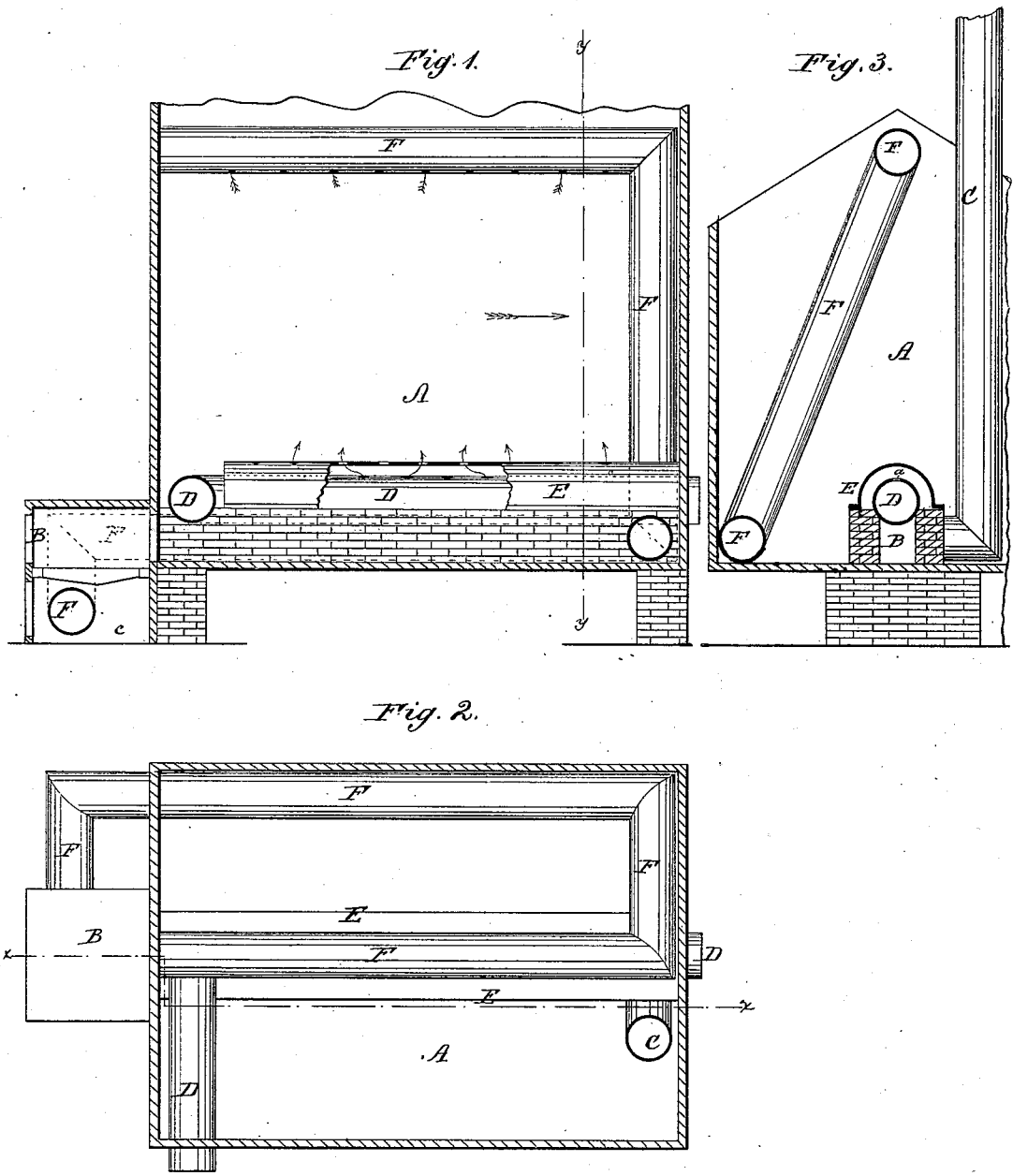

DANIEL ASBURY, OF CHARLOTTE, NORTH CAROLINA.

IMPROVEMENT IN DRYING APPARATUS.

Specification forming part of Letters Patent No. 206,521, dated July 30, 1878; application filed June 24, 1878.

*To all whom it may concern:*

Be it known that I, Dr. DANIEL ASBURY, of Charlotte, in the county of Mecklenburg and State of North Carolina, have invented a new and Improved Drying Apparatus; and I do hereby declare that the following is a full, clear, and exact description of the same.

My invention relates to an improved apparatus for drying fruit, lumber, tobacco, &c.; and consists in the construction and arrangement of parts, as hereinafter described and claimed, whereby I produce an apparatus which combines the desirable qualities of simplicity and economy of construction with efficiency and economy in use.

In the accompanying drawing, Figure 1 is a sectional elevation of my improved drier on line *x x*, Fig. 2. Fig. 2 is a horizontal section; Fig. 3, a cross-section on line *y y*, Fig. 1.

A is the drying room or house, and B a furnace, which extends along the bottom thereof, and terminates in a chimney, C, which is also within the room A. The fire-box of the furnace may be located wholly or partly exterior to the room. A tube or hollow cylinder, D, forms the top of the furnace within the room A, its open ends being extended through the walls of the latter.

A series of perforations, *a*, is formed in the upper side of the tube D, for the purpose of allowing free escape into the room A of the air, which enters the ends of the tube and becomes heated therein. The lower side of the tube D being in immediate contact with the fire, it may attain a red heat, and any particles of the fruit or other substance being dried which might chance to fall through the perforations *a* would be quickly burned or charred on the bottom of the tube, while the smell or odor of the same would be disseminated through the room A by the ascending air-currents. To prevent such accident and result I employ a guard, E, which is a perforated semi-cylindrical plate, having lateral flanges, to adapt it for self-support, on the side walls of the furnace, but made detachable from the latter, so that it may be easily removed when required.

The perforations *b* in said guard E are so located as not to be in coincidence with the holes *a* in the furnace-tube D, so that any particles of the substance being dried in chamber A which may fall through the holes *b* will lodge on the upper side of the tube, and hence not become burned or charred.

Although the air drawn in through the tube D is fresh, it may become vitiated and offensive by the vapors or odors arising from the substance being dried, and hence I provide a means of drawing off or removing the air at the top of the room A. Said means consist of a tube, F, which leads to the lower part of the fire-box *c*. That part of tube F which extends along the side of the room may be inclined downward toward the furnace, instead of being horizontal, and the part that extends along the top of the room is perforated on the under side. Thus the heated air entering the room through tube D, having performed its function therein, escapes into tube F, and is by it conducted to the fire-box and delivered beneath the grate thereof, where it enters into and supports combustion. Incidental to such abstraction of offensive odors from the drying-room, I utilize the heat as much as practicable by extending the eduction-tube F along the sides of the room interiorly, in place of arranging it exteriorly thereof.

In drying tobacco, the degree of heat applied requires to be very low at first, and hence the ends of the furnace-tube D will be provided with valves to prevent free ingress of air until such time as a brisk heat is employed.

By my improved apparatus I am able to dry fruit and other substances very quickly and in a superior manner, with but a small amount of fuel.

The construction of the apparatus is also comparatively simple and inexpensive. I may in some cases employ a removable wire-gauze screen in place of the plate-guard E.

What I claim is—

1. In a drying apparatus, the combination, with the drying room or house and a furnace or flue extending through the same, of an air-induction tube forming the top of said furnace or flue, and having its ends extending through the walls of the room or house, and provided with perforations in its upper side, as shown and described.

2. In a drying apparatus, the combination, with the drying room or house and a furnace or flue extending through the same, of an air-induction tube forming the top of said furnace or flue, and having its ends extending through the walls of the room or house, and provided with perforations in its upper side, and the perforated air-induction tube, as set forth, extending through the room and connected with the fire-box of the furnace, all as shown and described.

3. In a drying apparatus, the combination, with the furnace and tube D, having perforations $a$, of the detachable guard E, having perforations $b$, which are so located as not to be coincident with those of the furnace-tube, as and for the purpose specified.

DANIEL ASBURY.

Witnesses:
AMOS W. HART,
SOLON C. KEMON.